Sept. 30, 1958  G. B. COOKE ET AL  2,853,735
METHOD AND APPARATUS FOR MOLDING CORK PRODUCTS
Filed May 18, 1955  2 Sheets-Sheet 1

INVENTORS
GILES B. COOKE
M. NORMAN TIMBS

BY Cushman, Darby & Cushman
ATTORNEYS

Sept. 30, 1958 G. B. COOKE ET AL 2,853,735
METHOD AND APPARATUS FOR MOLDING CORK PRODUCTS
Filed May 18, 1955 2 Sheets-Sheet 2

INVENTORS
GILES B. COOKE
M. NORMAN TIMBS
BY
Cushman, Darby & Cushman
ATTORNEYS

United States Patent Office 2,853,735
Patented Sept. 30, 1958

2,853,735

METHOD AND APPARATUS FOR MOLDING CORK PRODUCTS

Giles B. Cooke and Mordecai N. Timbs, Baltimore, Md., assignors to Crown Cork & Seal Company, Inc., Baltimore, Md., a corporation of New York Application May 18, 1955, Serial No. 509,353

4 Claims. (Cl. 18—4)

The present invention relates to an apparatus for molding cork rods and subsequently removing the rods from the mold.

In the manufacture of crown type closures for use in capping bottled beverages, it is necessary to provide a cork disc or the like on the inside of the metal shell and, thus, provide a surface upon which the top of the bottle forms a seal. Cork discs, in present day manufacturing practices, are composed of a mixture of properly screened cork particles and an adhesive material. As the adhesive material, there is conventionally employed glue or synthetic resins, e. g., phenol-formaldehyde, urea-formaldehyde or melamine-formaldehyde, together with a polyhydric alcohol, such as glycerine, ethylene glycol, propylene glycol, diethylene glycol or triethylene glycol, as solvent plasticizers for the glue or thermosetting synthetic resin and as a softener for the cork. Mixtures of glue or other proteins, e. g., zein or casein, with synthetic resins and solvent plasticizers are also employed.

The mixture of granulated cork and adhesive is compressed into molds, e. g., three inch cylindrical molds, and is then baked. After baking, the product in the molds is passed through one or more water filled cooling troughs. This cooling of the compressed and heat treated rods sets the rods, so that they will not expand out of shape after their release from the molds. When the molds containing the rods are sufficiently cooled, e. g., to about 110° to 120° F., the product is ejected from the molds in the form of composition cork rods. After the cork rods have been properly seasoned, they are then sliced into discs for insertion into the metal shell to form the end product of a crown type closure.

Present day operation is typified by Goebel, Patent No. 1,627,601, the entire disclosure of which is hereby incorporated by reference.

While the method of operation disclosed in the Goebel patent is for the most part satisfactory, there are several disadvantages inherent therein, due to the length of time required for the carrier molds to pass through the cooling water troughs. Additionally, a large quantity of water is required to cool the hot molds which adds to the expense of the process. Also, considerable floor space is required to hold the trough containing the cooling water. Furthermore, there is the relatively large heating expense required in heating the water cooled molds up to baking temperature.

Accordingly, it is an object of the present invention to shorten the period of time required in the molding and baking cycle for forming cork rods.

It is an additional object to increase the daily output per unit of equipment, e. g., per mold, employed in this cycle.

It is a further object to obtain substantial savings in the quantity of water or other cooling medium used to cool the cork rods.

A still further object is to obtain a substantial saving in the cost of heating the carrier molds.

Another object is to design a more compact molding and baking system, whereby there is a substantial saving in floor space.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the accomplishment of these and other objects can be attained by ejecting the cork rods directly from the hot molds into a cooling tube having substantially the same interior diameter as the mold and thus eliminating the cooling of the carrier mold other than that incidental to any space of time, when it is not in the heating unit. It has surprisingly been found that, not only is there no latitudinal expansion of the cork rods, but contrary to what would be expected, there also is no longitudinal expansion of the rods and they emerge from the cooling tube with the same dimensions they had in the molds, e. g., a rod formed in a three inch mold having a one inch internal diameter, emerges from the cooling tube permanently set as a rod three inches long with a one inch diameter.

Referring to the drawings:

Figure 3 is a vertical section of the cooling tube.

Figure 1:
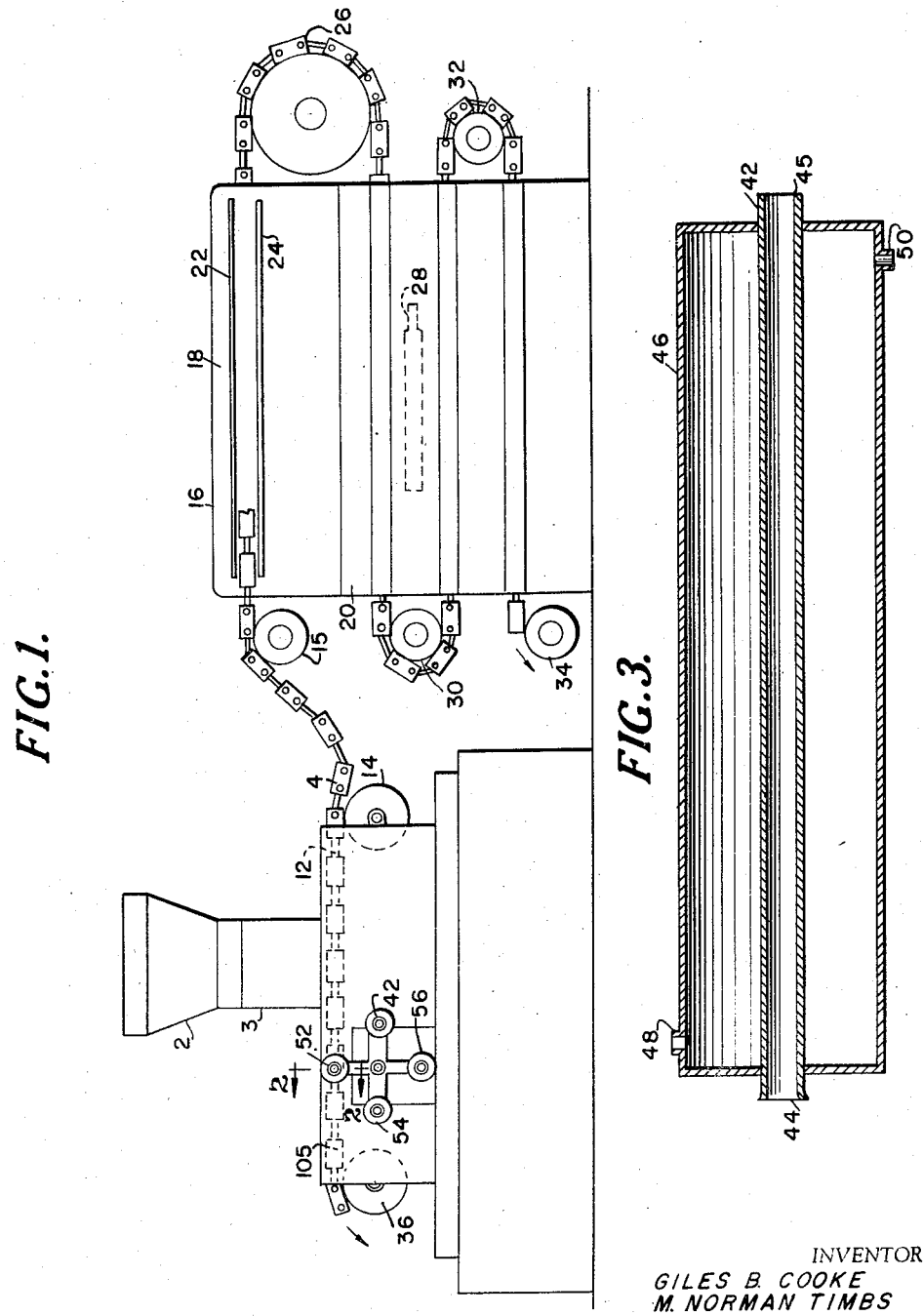
Figure 1 is a diagrammatic view of the complete apparatus.

Referring to the drawings, and more particularly Figure 1 thereof, there is shown a hopper 2, packing means shown generically at 3, and a conveyor chain 5 having a plurality of carrier molds 4. Any conventional packing means, such as for example that of the aforementioned Goebel patent, can be employed. The carrier mold 4 can be of conventional design to produce three inch rods, approximately one inch in diameter. For example, the mold can be of the open end type with one of its ends closed by slidable shutter or gate 6. A charge of cork particles with their coating of adhesive, e. g., a glueglycerine-triethylene glycol mixture which has been confined, is then inserted into the carrier mold 4 by means of a ram (not shown). After the charge has been inserted into the carrier mold, the second shutter or gate 8 is moved from the open to the closed position and the carrier mold with its charge is then ready for the baking operation.

Figure 2:
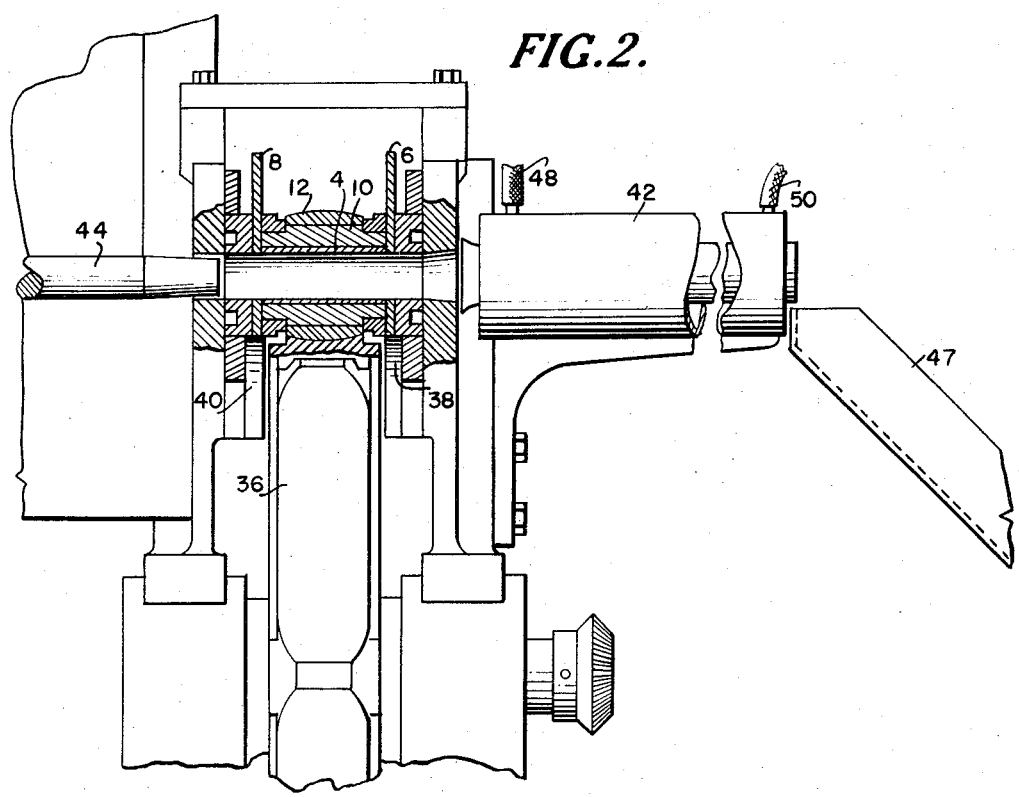
Figure 2 is a section on the line 2—2 of Figure 1, showing the ejection means for removing cork from the conveyor and also showing the cooling tube.

The conveyor chain 5 is made up of a plurality of links 10, each carrying one or more, preferably two, carrier molds 4 connected by couplings 12. From the packer 3, the chain moves over sprocket 14 and roller 15 to the top of oven 16. Movement may be accomplished with the aid of any convenient driving means (not shown), such as an electric motor, for example. Movement is intermittent, the carrier molds being packed during the rest periods. The oven may be heated by any suitable means, e. g., coal, gas or electricity. Preferably, the oven is gas fired. In the apparatus shown in the drawings, the oven 16 is composed of an upper compartment 18 and a lower compartment 20. The upper compartment 20 is heated by ribbon gas burners 22 and 24 between which the chain passes. The chain then passes over sprocket 26 and enters lower compartment 20 which is heated by gas heater 28. After passing through the lower chamber, the chain is led over sprocket 30, re-enters the lower chamber, passes over sprocket 32, enters the lower chamber again and finally exits from the lower chamber over roller 34. The chain next goes over sprocket 36 and then over cam tracks 38 and 40 (Figure 2) which force upward shutters 6 and 8 to the open position as they reach cooling tube 42. During one of the periods of rest of the chain, while a previous mold is receiving a new charge, a subsequent mold is positioned in alignment with ejector ram 44. Thus, the movements of the packing and ejecting rams are synchronized. By advance of the ejecting ram, the hot cork rods are ejected into cooling tube 42 and after passing through the exit 45 of the cooling tube, the rods are collected in a bin or directed onto a suitable conveyor by means of chute 47. The mold, after removal of the hot cork rod, continues through the cycle. Shutter 6 is closed by any suitable means (not shown), e. g., a push block, and the mold is then ready to receive a new charge as it reaches packing means 3.

Cooling tube 42 has substantially the identical interior diameter as the interior diameter of the carrier mold. The diameter of the lip 44 of the cooling tube into which the hot cork rods are ejected is slightly larger than the diameter of the rest of the tube. This is to compensate for any slight expansion in the diameter of the rod as its passes from the mold through a short air space into the cooling tube and also to help ease the cork rod into the main part of the cooling tube. Within about a sixteenth of an inch from the lip, the inner diameter of the cooling tube is adjusted to substantially the inner diameter of the carrier mold, as previously set forth.

As the cooling tube is not part of the continuous chain, it can be of any desired length to insure cooling. An air cooled tube can be employed, but in view of the relatively great length required for such a tube, it is preferable to enclose the body of the tube in a cooling jacket 46 through which a cooling fluid, such as water, enters from a tube 48 near the point of admission of the hot cork rod to the cooling tube and exits through a tube 50, near the exit of the cooled cork rod from the cooling tube. The length of the cooling tube 42 will depend on the temperature of the cooling fluid maintained in jacket 46 and the rate of circulation of the fluid through the jacket. The colder the fluid and the greater the rate of circulation, the shorter will be the length of the cooling tube required.

Figure 4:
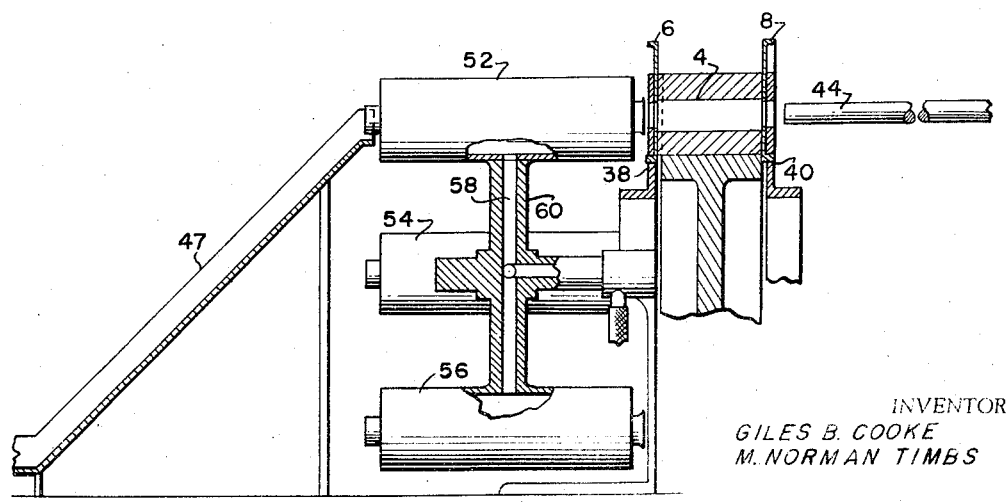
Figure 4 is a side view partially broken away and in section, illustrating the use of a plurality of cooling tubes.

When the time for the cycle of the chain from the packing to ejection is reduced, the oven temperature is necessarily increased to insure complete baking of the cork rods. Additionally, with a shortening of the cycle, an adjustment is necessary to maintain the temperature of the cork rods as they exit from the cooling tube at a sufficiently low temperature. This can be accomplished by using a longer tube or a colder cooling medium as previously mentioned or, it is sometimes preferable to employ a rotary series of cooling tubes 52, 54 and 56, as shown in Figure 4. These tubes can be rotated with the aid of conventional power means (not shown), so that the cork rods are ejected in succession into the tubes in order that the time of cooling can be increased, for example fourfold (as with the apparatus of Figure 1) without making the cooling tube objectionably long. In this embodiment of the invention, cooling fluid can enter and exit from the cooling tubes through a hollow core 58 in the shaft 60.

In a specific operation, the endless conveyor was made up of a chain of 114 "F" metal links with stainless steel linings of two molds each and, thus, produced 228 three-inch cork rods per cycle. The complete chain cycle took 15.25 minutes. 14.5 grams of cork coated with the glue-glycerine-triethylene glycol mixture were packed into each mold which was three inches long and had an inner diameter of about one inch. The chain of carrier molds packed with cork passed through the oven maintained at 290° F. in the upper chamber and at 335° F. in the lower chamber. The chain was in the heated oven for a total of 9 minutes and 40 seconds. The molds were in the oven long enough that the cork reached a temperature of 240° to 260° F. The cork rods were then ejected from the carrier molds into the cooling tube and new cork was packed into the molds which were at a temperature of approximately 230° F. Surprisingly, no trouble was encountered in packing the hot molds. The packed molds then were again passed through the furnace. The only cooling of the molds was that caused by the short exposure to the atmosphere during the ejecting and packing steps. In the specific example, the molds were only cooled about 10° to 30° F., while they were out of the oven.

In the specific example, a cooling tube 15.75 inches long was used. This tube had an inner diameter substantially the same as the inner diameter of the carrier mold. The lip of the tube, as previously mentioned, was of slightly larger inner diameter for a distance of about 1/16 inch. The cooling tube was long enough that five cork rods were packed in it simultaneously. The presence of a plurality of rods prevented any substantial longitudinal expansion of the individual rods which was unexpected, because workers skilled in the cork rod-forming art predicted that the ejection of hot rods from the molds would result in undesirable expansion of the rods and, hence, the process would be inoperative.

The three inch cork rods, manufactured by this process, were substantially identical with those manufactured in the old conventional method of cooling the carrier molds before ejecting the rods.

In the specific example, water was flowed through the jacket at a rate that the temperature of the water as it left the cooling tube was about 80° F. The three inch rod discharged from the cooling tube had a temperature of about 100° F. Each rod remained in the cooling tube about 15 seconds.

In a second experiment, the chain cycle was reduced to 12 minutes and the same cooling tube was employed. The rate of water flow through the jacket was increased so that the water temperature, as it exited from the jacket, was about 80° F. and the cork rod had a temperature of about 100° F.

In general, the cork rods are baked in the heating zone for about 2 to 16 minutes at an oven temperature sufficient to impart a temperature of 240 to 260° F. to the cork. The entire chain cycle can take from about 2 to 20 minutes, the longer chain cycle being used with the longer time in the heating zone. The cork rods are passed through the cooling tube during a period of between about 10 seconds and 3 minutes. The temperature of the cooling tube is maintained so that the cork rods emerge therefrom at a temperature not above about 120° F. and preferably not over 100° F.

The present process is carried out at atmospheric pressure and there is no need to employ special vacuum equipment or to unduly heat the cork as has been proposed in one method of forming cork into rods and subsequently cooling the rods.

As previously pointed out, the use of the external cooling tube considerably shortens the baking cycle, results in a greater output per day per unit, gives a substantial saving over the large quantity of water previously required to cool the hot three inch molds and also results in considerable saving in heat consumption as the carrier molds are not cooled to any substantial degree. In addition, the system is more compact than in the conventional three inch cork rod molding unit of Goebel for example.

What we claim is:

1. In an apparatus for forming cork rods, an endless conveyor, a plurality of carrier molds carried by the conveyor, means for inserting cork into said carrier molds, means for providing a heating medium through which medium the conveyor conveys the carrier molds, means for cooling the cork rods after they are removed from the carrier molds, said cooling means comprising an elongated tube open at both ends and sufficiently long to accommodate a plurality of said cork rods and means for ejecting the hot cork rods sequentially into said open ended tube from the carrier molds.

2. The apparatus of claim 1, in which the elongated tube has a slightly larger inner cross section at the end in which the cork rods are injected than the inner cross section of the carrier mold end and has throughout substantially the balance of its entire length substantially the same inner cross section as the inner cross section of the carrier mold.

3. The apparatus of claim 2, in which the cooling means comprises a plurality of elongated tubes and means for selectively operating the ejecting means so that the cork rods can be introduced to these tubes in any desired order.

4. The method of forming cork rods, comprising packing granular cork coated with an adhesive into molds, baking the cork rods in a heating zone for a time of from 9 to 16 minutes at a temperature sufficient to impart a temperature of 240° to 260° F. to the cork, removing the cork in the molds from the heating zone, ejecting the cork from the mold into a cooling tube having substantially the same interior diameter as the mold, passing the cork through the cooling tube for a period of time between 10 seconds and 3 minutes, the temperature of the cooling tube being maintained so that the cork as it emerges from the cooling tube has a temperature of not over about 120° F. and then removing the cork rods having substantially the same dimensions as they had in the molds from the cooling tube.

References Cited in the file of this patent

UNITED STATES PATENTS

| | | |
|---|---|---|
| 1,453,617 | Bond | May 1, 1923 |
| 1,478,873 | Harrich | Dec. 25, 1923 |
| 1,545,266 | Marsa | July 7, 1925 |
| 1,627,601 | Goebel | May 10, 1927 |
| 2,104,673 | Rieser | Jan. 4, 1938 |
| 2,642,621 | Amo | June 23, 1953 |